Aug. 22, 1961 L. ROSENBLOOM 2,996,950

STEREOSCOPIC VISUALIZERS

Filed Dec. 31, 1956 2 Sheets-Sheet 1

INVENTOR.
Louis Rosenbloom.
BY
[signature]
ATTORNEY.

United States Patent Office 2,996,950
Patented Aug. 22, 1961

2,996,950
STEREOSCOPIC VISUALIZERS
Louis Rosenbloom, 71 Seneca St., Box 508, Geneva, N.Y.
Filed Dec. 31, 1956, Ser. No. 631,913
2 Claims. (Cl. 88—16.6)

This invention relates to stereoscopic visualizers, and more particularly to a visualizer utilizing sequences of three or more stereoscopic views adapted to full observation free of blind spots and pseudoscopic effects by a person or group of persons without requiring the use of any special apparatus by the observers.

In an application Ser. No. 442,262 filed July 9, 1954, now U.S. Patent No. 2,974,562, and also in Patent No. 2,684,013 issued July 20, 1954, there is disclosed by me a stereoscopic visualizer offering viewing by observers without necessitating observer borne apparatus. The visualizer there shown employs a viewing grid composed of a series of reflecting and clear, or oppositely polarized pairs of panels each of a width equal to half the interpupillary spacing, with such pairs separated by opaque panels, the purpose of the latter being to prevent pseudo stereoscopic effects. The opaque panels result in blind spots, the effect of which is overcome by causing the grid to oscillate or traverse the line of view.

The present invention is directed to a system wherein the blind spots are eliminated, and in which no moving parts are required. The invention further has to do with the utilization of a sequence of stereoscopic views, at least three or more in number which form a sequence of stereo pairs of two or more in number. Through the use of a sequence of three or more stereoscopic views, the possibility of pseudo stereoscopic effects is eliminated, without necessitating the use of opaque panels which block the full observation of the stereoscopic views.

An observer having binocular vision is unable to instantaneously observe an entire view. The observer's eyes are constantly in motion, and in effect rove or scan a view over a period of time, in observing the entire scene. This factor is employed in the present invention by utilizing a sequence of stereoscopic pairs, and providing a visualizer which limits the observer's view of any one picture to a stereo sequence of views of the picture. Observation is forced to corresponding increments of stereoscopic pairs of pictures.

The observer in viewing the entire picture which comprises successive stereoscopic views, in effect superimposed, is permitted to view continuous parts of successive stereoscopic pairs of the views of such picture, as the observer's eyes scan or rove across the picture transversely thereof.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

Figure 1:
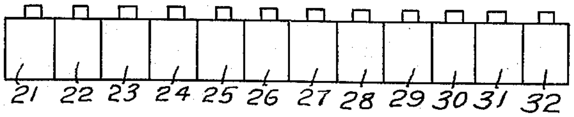
FIGURE 1 is a diagrammatic illustration of a gang of cameras adapted to take a stereoscopic sequence of views of a scene.

Referring to FIGURE 1, there are shown twelve cameras, 21 to 32 arranged in line, with their adjacent lens centers spaced apart 2½" to 3", the range of interpupillary spacing, the cameras being adapted to simultaneously take a series of twelve planar views 21' to 32' hereinafter to be referred to. The two views 21' and 22' taken by cameras 21 and 22 will constitute a stereoscopic pair. Likewise the views 22' and 23' taken by cameras 22 and 23, and other adjacent pairs will likewise constitute stereoscopic pairs.

Figures 2, 3:
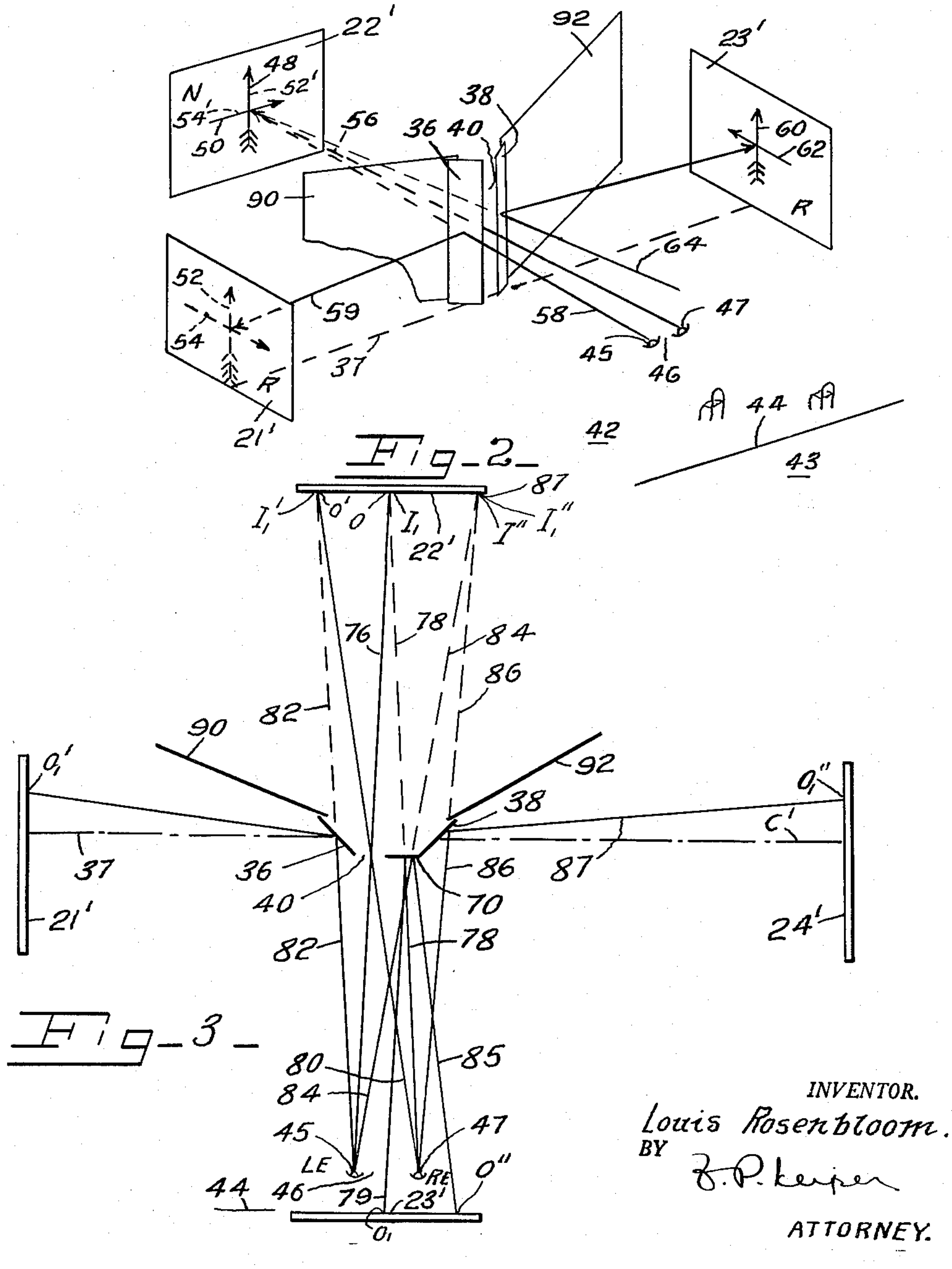
FIGURE 2 is a perspective diagram showing utilization of a sequence of three stereoscopic views.
FIGURE 3 is a perspective diagram showing utilization of a sequence of four stereoscopic views.

Referring to FIGURE 2, there is shown schematically in perspective, an arrangement for viewing a sequence of three views, such as taken from cameras 21, 22 and 23, in which views 21' and 22' constitute a stereoscopic pair, and views 22' and 23' constitute a stereoscopic pair. In this arrangement a pair of vertically extending mirrors 36 and 38 disposed at 45° angles to the transverse line 37 are provided, the mirrors, being spaced apart by a distance of 1¼" to 1½" or one-half interpupillary spacing to provide an open space 40, 1¼" to 1½" wide. Such mirrors are of a width of about 2⅛" to provide an effective width of 1¼" to 1½" at line 37. Disposed at equal distances from the open space 40, and the center of mirrors 36 and 38 are views 22', 21' and 23' respectively. The views are all of the same size. However, views 21' and 23' are reversed whereas view 22' is normal. The three views are all arranged so that they may appear superimposed on one another, when viewed two at a time in stereo pairs through what may be referred to as a stereo window, which comprises the mirrors 36 and 38, and the intervening open space 40.

An observer 46 positioned in the viewing area 42 which consists of all space forward of the boundary 44, may observe, with his right eye 47 the crossing of the arrows 48—50 of view 22', and will see the image of crossing arrows 52 and 54 of view 21' with his left eye 45, the image of view 21' being superimposed on the arrows 48 and 50 of view 22'. Thus stereoscopic viewing of views 21' and 22' is provided. The line of sight of the right eye will be along line 56, whereas the line of sight for the left eye will be along the line 58, which is reflected as at 59. The lines 58 and 56, however, converge at the object 48—50, and thus the image 52', 54' of object 52, 54 of view 21' appears superimposed on object 48, 50 of view 22'. Should an observer be slightly to the right, so that the left eye sees object arrows 48, 50 through the open slot 40, along line of sight 56, the right eye will then see object 60, 62 of view 23' along sight line 64, the image of which will be superimposed upon object 48, 50 by reason of sight line 64 and line 56 converging at the object formed by the crossing of arrows 48 and 50 on view 22'. Thus stereoscopic vision is provided either through superimposed observation of views 21' and 22', or 22' and 23'.

The observer without changing his position may veer his lines of vision from observing views 21' and 22', to a viewing of 22' and 23', but since view 22' serves either as a right or left eye object, pseudo-stereoscopic effects are eliminated since 22' and 23' are a stereo pair also. So long as the observer is in the viewing area 42, forward of the boundary 44, which boundary is located at the same distance from opening 40 as is view 22', the stereoscopic effect will result, free of any pseudo effects. Reference may be had to Patent No. 2,684,013, for a discussion of the principles involved in respect to the viewing area, and the width of viewing grid panels. As therein explained, location beyond the boundary 44, as in the area 43 will permit the viewer a limited opportunity to view an object of any one view with both eyes, so as to render such location undesirable. The observer may move laterally within the viewing area and thus see the entire composite picture of superimposed views, always, however, stereoscopically. By reason of the employment of three views in a stereo sequence, the portion of the picture susceptible to the observer's view at any one location or at any instant is broadened.

A composite continuous image is intercepted by the reflectors 36, 38, and the open slot 40, which form the stereo window. When viewed with one eye from one position, this composite image consists of a part of 21′, followed by a continuing part of 22′ to the right of the part of 21′, followed by a continuing part of 23′ to the right of the part of 22′. Thus while the left eye sees parts of 21′, 22′, 23′, the right eye sees corresponding stereo parts of 22′, 23′ which correspond respectively to parts 21′ and 22′ as seen by the left eye. There is no perception, however, of the parts per se. The image is perceived as a whole and as stereo.

In FIGURE 3 there is shown an arrangement for utilizing a sequence of four stereoscopic views 21′, 22′, 23′ and 24′, whereby the stereo window is widened. In this arrangement, mirrors 36 and 38 are spaced 2½″ to 3″ apart to afford an open space 40, 1¼″ to 1½″ wide, and a third mirror 70, 1¼″ to 1½″ wide. Views 21′ and 22′ are disposed substantially as before, while view 23′ is disposed at the boundary line, and view 24′ is located in view through mirror 38. All views are of the same size, and at the same optical distance from the observer.

Views 21′, 23′ and 24′ are reversed, because of reflected view, while view 22′ is normal. Assuming that each view consists of three consecutive objects, O′, O, O″, a viewer 46 will, with his left eye 45, see object O on view 22′ and object O′ of view 23′, and thus superimpose image $I_1$ on object O, so as to view simultaneously object O with his left eye, and object $O_1$ with his right eye, of views 22′ and 23′, the portions thereof as thus simultaneously seen, comprising a stereoscopic pair. The line of sight of the left eye is indicated as at 76, while the line of sight of the right eye is as at 78, such lines converging at O, it being understood that line 78, by reason of reflection extends as at 79 to view 23′.

When the observer's lines of vision veer to the left, his right eye 47 then sees object O′ of view 22′, while his left eye sees object $O_1'$ of view 21′, which would appear as an image $I_1'$ superimposed on O′ on view 22′. His line of sight for the right eye becomes 80, whereas the line of sight for his left eye becomes line 82, the extension of which converges at O′, and the reflected portion 83 of which extends to $O_1'$, the point on view 21′ which corresponds with the point O′ on view 22′. When the observer's lines of vision veer to the extreme right, he sees stereoscopically corresponding parts of view 23′ (located behind him) through mirror 70, and view 24′ through mirror 38. Thus through lines of vision 84 and 86 reflected as at 85 and 87, object O″ of view 23′ is seen simultaneously with corresponding object $O_1''$ of view 24′, and images thereof I″ and $I_1''$ are seen as superimposed as at 87.

Accordingly, at any one position, an observer has a laterally enlarged view of the picture over that of FIGURE 2, but his view of any particular picture object must be stereoscopic by reason of his view of any object on one view being restricted to one eye, while the view of the other eye is restricted to the corresponding object of the other view, forming with the one view, a stereo pair.

In both FIGURES 2 and 3 opaque blinds or screens as indicated at 90 and 92 may be provided to prevent unwarranted viewing of the picture 22′ except through the opening 40.

Figures 4, 5:
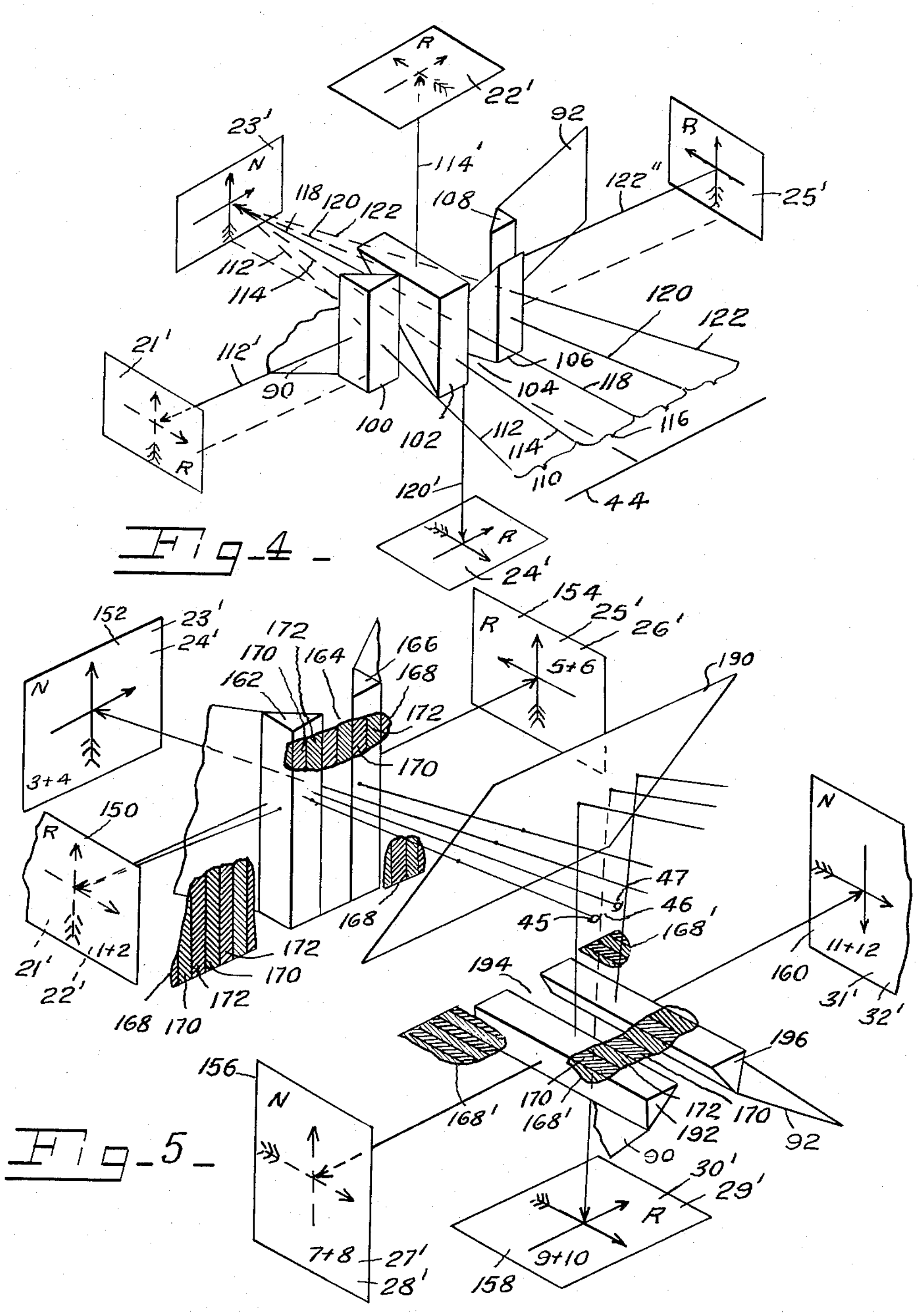
FIGURE 4 is a perspective diagram showing utilization of a sequence of five stereoscopic views.
FIGURE 5 is a perspective diagram showing utilization of a sequence of twelve stereoscopic views.

A sequence of five pictures 21′, 22′, 23′, 24′ and 25′, for example, may be arranged as shown in FIGURE 4 whereby the stereo window may be approximately 6¼″ to 7½″ wide.

In this arrangement three of the views are disposed substantially as shown in FIGURE 2, while additional views are disposed above and below the visualizer. The sequence of stereoscopic views 21′, 22′, 23′, 24′ and 25′ are as shown. View 21′ is observed through a reflector 100, which may take the form of a 45° prism, such prism being 1¼″ to 1½″ wide. View 22′ is seen through a prism 102 of the same width but reflecting upwardly. View 23′ is viewed through the open space 104 of the same width, such space being defined by the spacing between prism 102, and prism 106, the latter prism affording view of view 24′ and reflecting downwardly. View 25′ is seen through the prism 108. All views, as before, are of the same size, and equi-distant optically from the observing area forward of the boundary 44, and so disposed as to cause the images of each of the views of the stereo pairs to superimpose on each other or upon the picture object 23′ in the plane of the picture 23′. The prisms 102 and 104 are shown with their reflective centers lying in the same plane as the reflective centers of prisms 100 and 108. If desired, the front faces of all prisms may lie in a common plane. Views 21′, 22′, 24′ and 25′ are reversed, while view 23′ is normal. The operation of the arrangement is similar to that of FIGURE 3, except for the increase in number of views in the stereo sequence employed. An observer at 110 sights with his left eye along line 112, and his right eye along line 114, which results in superimposing the corresponding images of views 21′ and 22′ upon the plane of screen 23′. Likewise, an observer viewing from a position at 116, will with his left eye sight view 22′ along line 114, and his right eye sight view 23′ along line 118, superimposing the image of view 22′ upon the corresponding object of view 23′. Similar lines of sight for images 24′ and 25′ are indicated at 120 and 122. In each case the deflected lines of sight 112, 114, 120 and 122 caused by the prisms is indicated by 112′, 114′, 120′ and 122′ respectively. Each observer, of course, sees the composite image through all of the stereo window.

In FIGURE 5 there is shown a schematic arrangement wherein a series of twelve views may be employed, as 21′ to 32′ inclusive, taken from cameras 21 to 32. Each of the frames or screens 150, 152, 154, 156, 158 and 160 comprises two views, as, for example, screen 150 comprises, views 21′ and 22′, superimposed, which constitute a stereoscopic pair. The view 21′ is polarized oppositely from view 22′. Such superimposed views oppositely polarized may be of the form commonly known as Vectographs, comprising transparencies of oppositely polarized superimposed stereo pairs, or they may be projected upon a non-depolarizing screen by oppositely polarized light. Views 21′ and 22′ of frame 150 are reversed, as are the views in frames 154 and 158, whereas the views in frames 152, 156 and 160 are normal. Viewing of frames 150, 152 and 154 by an observer 46 is through the reflective prism 162, the open space 164, and the prism 166 respectively. The width of the prisms and space are 2½″ to 3″ instead of 1¼″ to 1½″ as previously described.

A filter 168 comprising alternately oppositely polarizing panels 1¼″ to 1½″ wide such as 170 and 172 is located immediately in front of and in contact with the prisms and opening, two such panels lying in front of each prism and opening. The polarizing panels are so oriented that sight by the observer through the left hand portion of prism 162 and through a panel 170, will enable the observer to view with his left eye 45, only view 21′, such picture being correspondingly polarized. Sight by the right eye 47 through the right hand side of the prism and a panel 172 will permit the observer to see only view 22′, such view being polarized to correspond to a panel 172. The observer may in respect to screen 152, view with his left eye 45, view 23′, a panel 170 covering the left hand half of the open space 164 being correspondingly polarized in respect to view 23′. With his right eye 47, he may simultaneously see view 24′ oppositely polarized from view 23′, through a panel 172 polarized to correspond to view 24′, and covering the right half of the open space 164. In a similar fashion, the observer with his left eye 45, may observe view 22′ through the right hand side of prism 162, and view 23′ with his right eye through the left hand half of the open space 164, it being understood that view 22′ is seen through a polarizing panel 172, whereas view 23′ is seen through an oppositely polarizing adjacent panel 170. The image of view 22′ will thus be superimposed on the view 23′.

Thus at all times the observer is permitted to see a stereoscopic pair, with vision of the left eye restricted to a view taken to the left of the other view of a stereo pair, while vision of the right eye is restricted to the view to the right of the pair. Thus a sequence of six views may be seen, but only adjacent views forming a stereo pair may be seen at any one instant. Such a sequence widens the stereo window to approximately 9″.

The system may be expanded to provide for observation of a sequence of twelve pictures by interposing a two way reflector 190 at a 45° angle in the line of vision, and disposing a second pair of prisms 192 and 196 having an open space 194 therebetween, similar in all respects to the prisms 162 and 166 and intervening open space 164, below the reflector, with frames 156, 158 and 160 arranged in the same manner thereabout as in the case of frames 150, 152 and 154. A filter having polarizing panels 170 and 172 is also provided. The two-way reflector permits vision through the reflector, equal to reflected vision, and the prisms 192 and 196 and prisms 162 and 164 are disposed on opposite sides of the reflector in a manner that would be regarded as symmetrical, except that the prisms 192 and 196 are placed immediately to the right and alongside of prisms 162 and 166, so that when seen through the reflector, prisms 166 and 192 appear touching.

Observation of the views 27′ to 32′ is the same as the observing of views 21′ to 26′. In fact, the observer may observe view 26′ through the right hand side of prism 166 and a polarizing panel 172 immediately in front thereof, while seeing view 27′ through the left hand side of prism 192 and a panel 170 polarized of filter 168′, so that the images will be superimposed to provide a stereo pair, the images appearing to be superimposed on the plane of frame 152.

By such a system the overall width of the stereo window may be increased to 15″ or 18″, depending on whether the prisms and open spaces are 2½″ or 3″ wide.

The filters 168 and 168′ shown in FIGURE 5 are shown as extending to either side of the prisms in order to facilitate illustration of the location of the filters. Such filters in practice need be but six panels wide located immediately in front of their respective prisms and intervening open space.

It should readily appear from the foregoing that the system of FIGURE 5 may employ prisms 1¼″—1½″ wide with an open space between of 1¼″—1½″ width, and with the polarized panels eliminated, in which case the panels 150, 152, 154, 156, 158 and 160 would be provided with a sequence of six views only such as 21′—26′, each frame thus having a single view, instead of superimposed pairs. Conversely, the system of FIGURE 5 may be applied to the arrangement of FIGURES 2, 3 and 4, by doubling the width of the mirrors or prisms, and open space, and by utilizing polarized panels and superimposed stereo pairs of oppositely polarized views in place of each of the single views.

It will be noted that in FIGURE 1, one image is employed which has the property of being either a left or right eye image, whereas in FIGURE 5 there are ten images which are either left or right eye images. The principle in all cases is the same. In binocular vision one's eyes move constantly and sometimes the whole head is moved. Part of the view seen with one eye may, the next instant, be seen with the other eye; yet there is no pseudoscopic vision nor interference since the spacial qualities are able to become either left or right eye images. The invention in all of the forms therefore uses the same principle by using an image or images which may be utilized by either eye.

The width of the reflective and open panels has been described as 1¼″ to 1½″, or one-half interpupillary spacing, except in the modification of FIGURE 5, wherein the filter panels are of such width. Such width applies, where the stero window is midway between the outer boundary of the viewing area and the views. Where location of the stereo window varies from being located midway, the width is so confined so as to prevent an observer located at the boundary line of the viewing area from simultaneous viewing with both eyes a single object of any one view.

It will also be noted that the width of the stereo window increases with the number of images used. It may therefore be stated as a general principle that one image is required for each 1¼″ or 1½″ of the stereo window, the size of the images themselves being immaterial.

Although several embodiments of the invention have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A stereoscopic visualizer comprising a viewing area having an outer boundary, a stereo window comprising at least three adjacent reflective and open panels, each of a width of at least 2½″ disposed along one side of said area, oppositely polarizing filter strips of half of said width disposed immediately in front of each of said panels, a sequence of stereo views corresponding in number to twice the number of said panels, stereoscopic pairs of said views being superimposed with the individual views of each pair oppositely polarized, said window being disposed optically midway between said outer boundary and said views and defining with said outer boundary a viewing area, said pairs of superimposed views being disposed in relation to said window for stereoscopic viewing of the stereoscopic views of each superimposed pair, and stereoscopic viewing of the stereoscopically related views of each two adjacent pair in the sequence.

2. A stereoscopic visualizer comprising a viewing area having an outer boundary, a stereo window comprising at least three adjacent reflective and open panels, each of a width of at least 2½″ disposed along one side of said area, oppositely polarizing filter strips of half of said width disposed immediately in front of each of said panels, a sequence of stereo views corresponding in number to four times the number of said panels, stereoscopic pairs of said views being superimposed with the individual views of each pair oppositely polarized, said window being disposed optically midway between said outer boundary and said views, a sequence of half of said pairs of superimposed views being disposed in relation to said window for stereoscopic viewing of the stereoscopic views of each superimposed pair, and stereoscopic viewing of the stereoscopically related views of each two adjacent pairs in the sequence, a light transmitting and reflecting screen angularly disposed forward of said window and between said window and outer boundary, and a second stereo window like said first named window having oppositely polarizing filter strips and having a stereo sequence of the remaining said views comprising superimposed oppositely polarized pairs disposed in relation to said second window for reflected viewing upon said screen from the viewing area between said screen and said outer boundary, said second window, filter and associated views being laterally offset from said first window by the width thereof, all of said views being optically equidistant from the outer boundary of said viewing area.

(References on following page)

References Cited in the file of this patent

UNITED STATES PATENTS

| | | |
|---|---|---|
| 1,550,214 | Leonard | Aug. 18, 1925 |
| 1,978,250 | Dilks | Oct. 23, 1934 |
| 2,336,938 | Keijzer | Dec. 14, 1943 |
| 2,631,496 | Rehorn | Mar. 17, 1953 |
| 2,684,013 | Rosenbloom | July 20, 1954 |

FOREIGN PATENTS

| | | |
|---|---|---|
| 253,512 | Switzerland | Mar. 15, 1948 |
| 276,194 | Switzerland | Oct. 1, 1951 |
| 691,180 | Great Britain | May 6, 1953 |
| 1,006,458 | France | Jan. 23, 1952 |